United States Patent
Kim

(10) Patent No.: US 8,760,419 B2
(45) Date of Patent: Jun. 24, 2014

(54) TOUCH SUBSTRATE AND METHOD OF MANUFACTURING THE SAME

(75) Inventor: Hee-Joon Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 739 days.

(21) Appl. No.: 13/028,283

(22) Filed: Feb. 16, 2011

(65) Prior Publication Data

US 2012/0032912 A1 Feb. 9, 2012

(30) Foreign Application Priority Data

Aug. 6, 2010 (KR) ........................ 10-2010-0075968

(51) Int. Cl.
*G06F 3/045* (2006.01)
*G06F 3/042* (2006.01)

(52) U.S. Cl.
CPC ..................................... *G06F 3/042* (2013.01)
USPC .......................................... 345/173; 345/174

(58) Field of Classification Search
USPC ................................. 345/173, 174
See application file for complete search history.

(56) References Cited

U.S. PATENT DOCUMENTS

| 2005/0116937 A1* | 6/2005 | Choi et al. ..................... 345/173 |
| 2008/0246739 A1* | 10/2008 | Choi et al. ..................... 345/173 |
| 2010/0225617 A1* | 9/2010 | Yoshimoto et al. ........... 345/175 |

FOREIGN PATENT DOCUMENTS

| JP | 2002-278504 A | 9/2002 |
| JP | 2006-330649 A | 12/2006 |
| JP | 2008-191822 A | 8/2008 |

* cited by examiner

*Primary Examiner* — Amare Mengistu
*Assistant Examiner* — Joseph G Rodriguez
(74) *Attorney, Agent, or Firm* — Cantor Colburn LLP

(57) ABSTRACT

A touch substrate includes a base substrate, a first sensing element and a first variable voltage part. The first sensing element senses a first light and includes a first active pattern disposed on the base substrate, a first sensing source electrode disposed on the first active pattern, a first sensing drain electrodes disposed on the first active pattern and spaced apart from the first sensing source electrode, and a first sensing gate electrode disposed on the first sensing source electrode and the first sensing drain electrode. The first variable part provides at least one of a first sensing gate voltage and a second sensing gate voltage to the first sensing gate electrode based on reception of the first light, where a level of the second sensing gate voltage is higher than a level of the first sensing gate voltage.

19 Claims, 12 Drawing Sheets

TOUCH SUBSTRATE AND METHOD OF MANUFACTURING THE SAME

This application claims priority to Korean Patent Application No. 2010-75968, filed on Aug. 6, 2010, and all the benefits accruing therefrom under 35 U.S.C. §119, the content of which in its entirety is herein incorporated by reference.

BACKGROUND OF THE INVENTION (1) Field of the Invention

Exemplary embodiments of the present invention relate to a touch substrate and a method of manufacturing the touch substrate. More particularly, exemplary embodiments of the present invention relate to a touch substrate including a sensing element with improved sensitivity and a method of manufacturing the touch substrate.

(2) Description of the Related Art

Generally, a liquid crystal display ("LCD") panel includes a first substrate on which a thin film transistor is formed to drive a pixel area, a second substrate disposed opposite to the first substrate and a liquid crystal layer disposed between the first substrate and the second substrate.

The LCD panel may function as a touch panel operated by an external touch. In a conventional LCD touch panel, the second substrate of the LCD panel may include a sensing element and a switching element that controls the sensing element. When the LCD panel is touched, the sensing element absorbs an incident light having a wavelength within a predetermined wavelength range to generate a photo current. A central processing unit connected to the LCD panel may determine a touch position using the photo current and a dark current of the sensing element which is determined before the incident light is absorbed.

The sensing element generally has electrical characteristics different from the switching element. The switching element typically controls turn-on and turn-off using a gate signal. In contrast, the sensing element of the LCD panel generates the photo current, so the sensing element may have a high sensitivity for the incident light. To improve the sensitivity of the sensing element, a size of an active pattern that receives the incident light may be substantially increased, or a thickness of the active pattern may be substantially increased. However, when the size of the active pattern is increased, the number of the sensing element disposed on the touch panel may be substantially decreased. In addition, when the thickness of the active pattern is increased, processing time may be substantially increased, and a base substrate may be bent due to a high stress.

SUMMARY OF THE INVENTION

Exemplary embodiments of the present invention provide a touch substrate with improved touch sensitivity.

Exemplary embodiments of the present invention also provide a method of manufacturing the touch substrate.

In an exemplary embodiment, a touch substrate includes a base substrate, a first sensing element and a first variable voltage part. The first sensing element senses a first light and includes a first active pattern disposed on the base substrate, a first sensing source electrode disposed on the first active pattern, a first sensing drain electrodes disposed on the first active pattern and spaced apart from the first sensing source electrode, and a first sensing gate electrode disposed on the first sensing source electrode and the first sensing drain electrode. The first variable part provides at least one of a first sensing gate voltage and a second sensing gate voltage to the first sensing gate electrode based on reception of the first light, where a level of the second sensing gate voltage is higher than a level of the first sensing gate voltage.

In an exemplary embodiment, the first variable voltage part may provide the first sensing gate voltage to the first sensing gate electrode when the first light is not received, and the first variable voltage part may provide the second sensing gate voltage to the first sensing gate electrode to increase a photo current of the first sensing element when the first light is received.

In an exemplary embodiment, the touch substrate may further include: a first switching element including a first switching gate electrode, a second active pattern disposed on the first switching gate electrode, and a first switching source disposed on the second active pattern, and a first switching drain electrode disposed on the second active pattern and spaced apart from the first switching source electrode; a first sensing gate line electrically connected to the first switching gate electrode to transmit a first sensing gate signal to the first switching gate electrode; a first bias voltage line electrically connected to the first sensing source electrode to transmit a first bias voltage to the first sensing source electrode; and a second bias voltage line electrically connected to the first variable voltage part to transmit a second bias voltage to the first variable voltage part.

In an exemplary embodiment, the first variable voltage part may include a first light blocking pattern which blocks the first light, a first variable source electrode disposed on the first light blocking pattern and electrically connected to the first bias voltage line, a second variable source electrode electrically connected to the second bias voltage line, a first common drain electrode disposed apart from the first variable source electrode and the second variable source electrode between the first variable source electrode and the second variable source electrode, where the first common drain electrode is electrically connected to the first sensing gate electrode, a first common active pattern disposed under the first viable source electrode, the second variable source electrode and the first common drain electrode, and a first common gate electrode disposed on the first variable source electrode, the second variable source electrode and the first common drain electrode and overlapping the first common active pattern.

In an exemplary embodiment, the first common gate electrode may be electrically connected to the second variable source electrode to receive the second bias voltage.

In an exemplary embodiment, the first variable voltage part may include a first light blocking pattern which blocks the first light, a first input electrode disposed on the first light blocking pattern and electrically connected to the first bias voltage line, a second input electrode electrically connected to the second bias voltage line, a first common output electrode is disposed apart from the first input electrode and the second input electrode between the first input electrode and the second input electrode, where the first common output electrode is electrically connected to the first sensing gate electrode, and a first common active pattern disposed under the first input electrode, the second input electrode and the first common output electrode.

In an exemplary embodiment, the touch substrate may further include: a second switching element including a second switching gate electrode, a third active pattern disposed on the second switching gate electrode, and a second switching source electrode disposed on the third active pattern and a second switching drain electrode disposed on the third active pattern and spaced apart from the second switching source electrode; a second sensing element which senses a second light, where the second sensing element includes a second sensing drain electrode electrically connected to the second switching source electrode, a second sensing source electrode disposed spaced apart from the second sensing drain electrode, a fourth active pattern disposed under the second sensing drain electrode and the second sensing source electrode and a second sensing gate electrode disposed on the second sensing drain electrode and the second sensing source electrode; and a second variable voltage part which provides at least one of a third sensing gate voltage and a fourth sensing gate voltage to the second sensing gate electrode based on reception of the second light, where a level of the fourth sensing gate voltage is higher than a level of the third sensing gate voltage.

In an exemplary embodiment, the touch substrate may further include a second sensing gate line electrically connected to the second switching gate electrode, a first read out line electrically connected to the first switching drain electrode to output a first signal from the first sensing element, and a second read out line electrically connected to the second switching drain electrode to output a second signal from the second sensing element.

In an exemplary embodiment, the touch substrate may further include a second light blocking pattern disposed under the first sensing element, where the first light is an infrared light and the second light is a visible light, and the second light blocking pattern transmits the first light and absorbs the second light.

In an exemplary embodiment, the touch substrate may further include a second light blocking pattern disposed under the second sensing element, where the first light is a visible light and the second light is an infrared light, and the second light blocking pattern transmits the second light and absorbs the first light.

In another exemplary embodiment, a method of manufacturing a touch substrate includes providing a first light blocking pattern on a base substrate, providing a first active pattern and a first common active pattern on the base substrate on which the first light blocking pattern is disposed, where the first common active pattern is disposed overlapping the first light blocking pattern, providing a first sensing source electrode and a first sensing drain electrode on the first active pattern, where the first sensing source electrode and the first sensing drain electrode are spaced apart from each other, providing a first variable source electrode, a first common drain electrode and a second variable source electrode on the first common active pattern, where the first variable source electrode, the first common drain electrode and the second variable source electrode are spaced apart from one another, and providing a first sensing gate electrode on the first sensing source electrode and the first sensing drain electrode and electrically connected to the first common drain electrode and providing a first common gate electrode on the first variable source electrode, a second variable source electrode and the first common drain electrode.

In an exemplary embodiment, the first active pattern and the first common active pattern may include an amorphous silicon germanium In an exemplary embodiment, the method may further include providing a second light blocking pattern on the base substrate before forming the first active pattern and the first common active pattern, where the second light blocking pattern may be disposed overlapping the first active pattern.

In an exemplary embodiment, the first light blocking pattern, the second light blocking pattern, the first active pattern and the first common active pattern may include an amorphous silicon.

In an exemplary embodiment, the method may further include providing an insulating layer between the first sensing source electrode and the first sensing gate electrode, between the first sensing drain electrode and the first sensing gate electrode, between the first variable source electrode and the first common gate electrode and between the second variable source electrode and the first common gate electrode, forming a contact hole on the insulating layer, where the contact hole exposes the second variable source electrode, and where the first common gate electrode is connected to the second variable source electrode through the contact hole.

In still another exemplary embodiment, a method of manufacturing a touch substrate includes providing a first light blocking pattern on a base substrate, providing a first active pattern and a first common active pattern on the base substrate on which the first light blocking pattern is disposed, where the first common active pattern is disposed overlapping the first light blocking pattern, providing a first sensing source electrode and a first sensing drain electrode on the first active pattern, where the first sensing source electrode and the first sensing drain electrode are spaced apart from each other, providing a first variable source electrode, a first common drain electrode and a second variable source electrode spaced apart from one another on the first common active pattern, and providing a first sensing gate electrode on the first sensing source electrode and the first sensing drain electrode and electrically connected to the first common drain electrode.

In an exemplary embodiment, the first active pattern and the first common active pattern may include an amorphous silicon germanium In an exemplary embodiment, the method may further include providing a second light blocking pattern on the base substrate before providing the first active pattern and the first common active pattern, where the second light blocking pattern is disposed overlapping the first active pattern.

In an exemplary embodiment, the first light blocking pattern, the second light blocking pattern, the first active pattern and the first common active pattern may include an amorphous silicon.

In exemplary embodiments, a sensing gate voltage applied to a sensing gate electrode of a sensing element which senses an infrared light and/or a visible light is controlled so that a photo current of the sensing element is substantially increased. Thus, a sensitivity of the sensing element is substantially improved.

BRIEF DESCRIPTION OF THE DRAWINGS

The above and other aspects, features and advantages of the invention will become more apparent by describing in detailed exemplary embodiments thereof with reference to the accompanying drawings, in which.

DETAILED DESCRIPTION OF THE INVENTION

Figure 1:
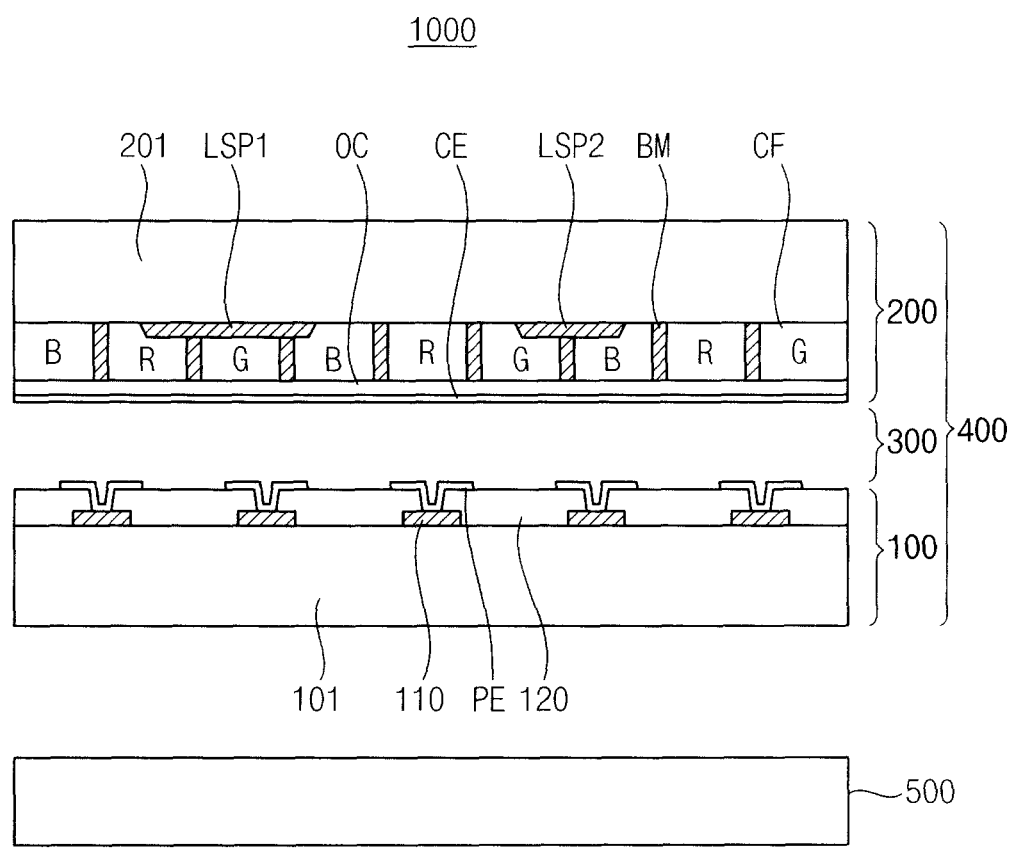
FIG. 1 is a cross-sectional view of an exemplary embodiment of a display apparatus according to the present invention.

The invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein Hereinafter, exemplary embodiments of the invention will be explained in detail with reference to the accompanying drawings.

FIG. 1 is a cross-sectional view of an exemplary embodiment of a display apparatus according to the present invention.

Referring to FIG. 1, the display apparatus 1000 includes a touch panel 400 and a backlight assembly 500 which provides a light to the touch panel 400.

In an exemplary embodiment, the touch panel 400 includes a display substrate 100, a touch substrate 200 disposed opposite to the display substrate 100 and a liquid crystal layer 300 disposed between the display substrate 100 and the touch substrate 200.

The display substrate 100 may include a pixel switching element 110 disposed on a first base substrate 101, a pixel electrode PE electrically connected to the pixel switching element 110 and an insulating layer 120. The insulating layer 120 may include a gate insulating layer (not shown) disposed on a gate electrode (not shown) of the pixel switching element 110 and a passivation layer (not shown) disposed on source and drain electrodes (not shown) of the pixel switching element 110.

The touch substrate 200 may include a first light sensing part LSP1, a second light sensing part LSP2, a first variable voltage part (not shown) and a second variable voltage part (not shown). The first light sensing part LSP1 may include a first sensing element (not shown) that senses an infrared light and a first switching element (not shown) that drives the first sensing element. The second light sensing part LSP2 may include a second sensing element (not shown) that senses a visible light and a second switching element (not shown) that drives the second sensing element. The first variable voltage part is electrically connected to a sensing gate electrode of the first sensing element and provides a variable gate voltage. The second variable voltage part is electrically connected to a sensing gate electrode of the second sensing element and provides the variable gate voltage.

The touch substrate 200 may further include a black matrix BM, a color filter layer CF, an overcoat layer OC and a common electrode CE. The common electrode CE may be disposed facing the pixel electrode PE, and generates an electric field in the liquid crystal layer 300.

The backlight assembly 500 is disposed under the display panel 100. The backlight assembly 500 may include a first light source (not shown) that generates the infrared light and a second light source (not shown) that generates the visible light. In an exemplary embodiment, the first and second light sources may be light emitting diodes.

Figure 2:
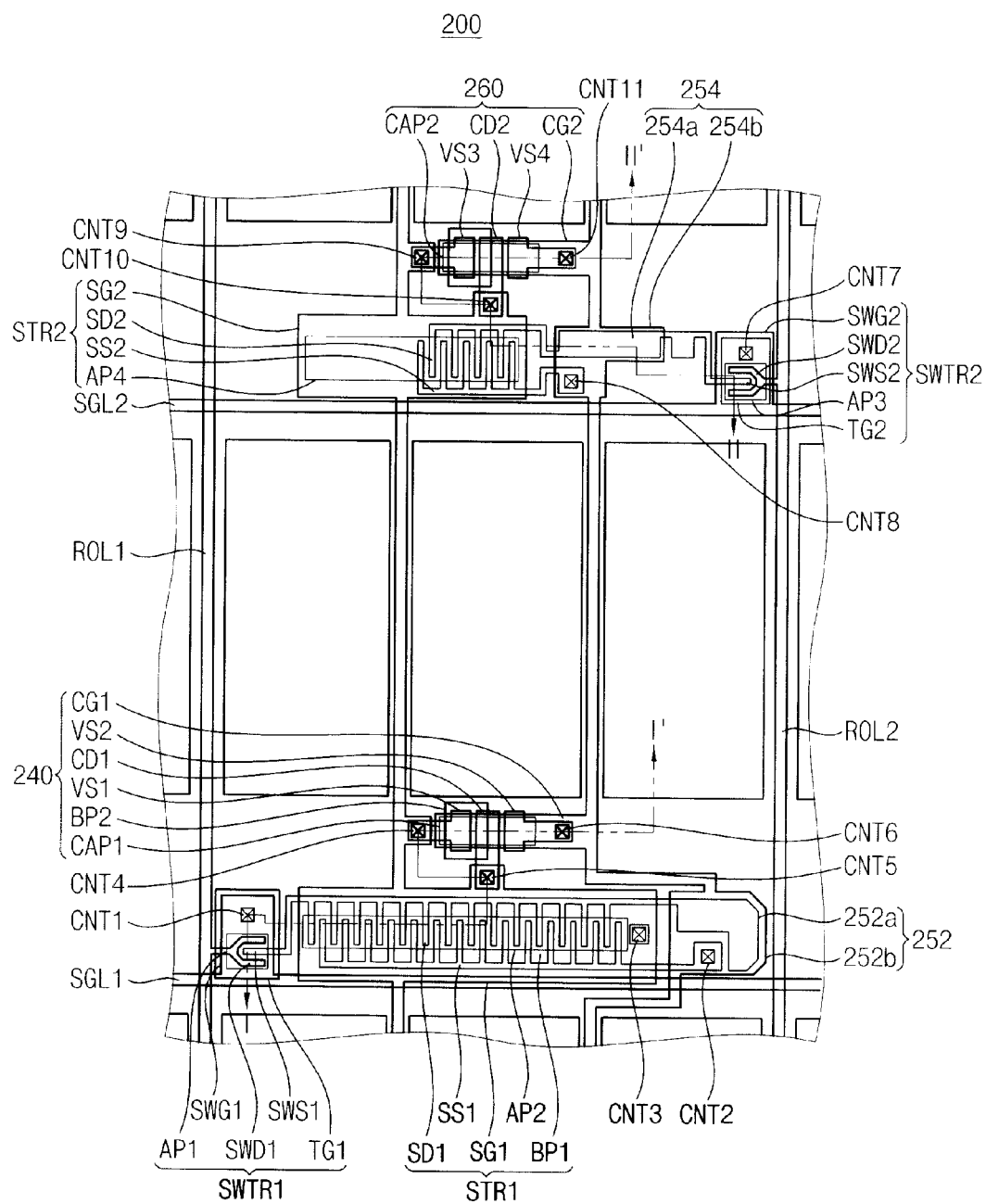
FIG. 2 is a top plan view of an exemplary embodiment of a touch substrate of FIG. 1.
Figure 3:
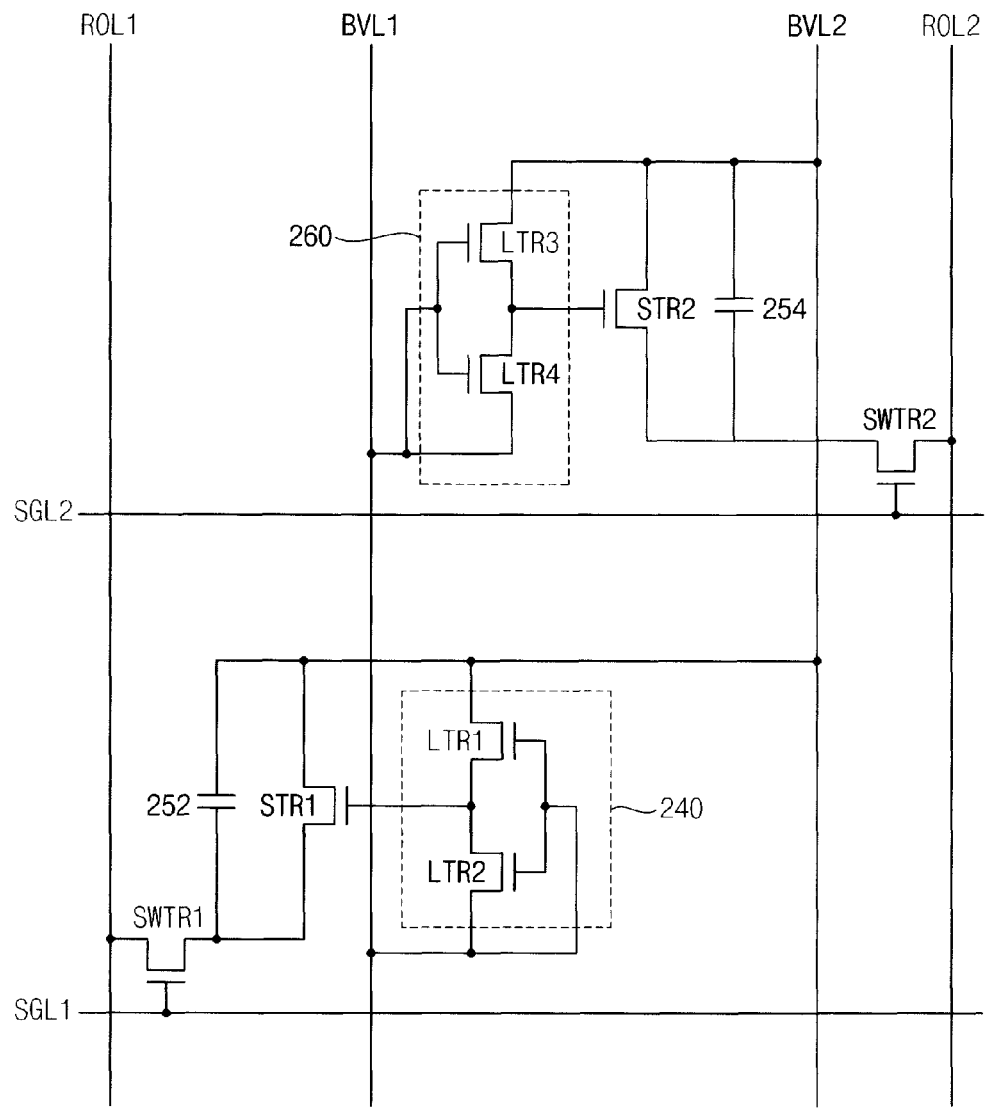
FIG. 3 is an equivalent circuit diagram illustrating the touch substrate of FIG. 2.
Figure 4:
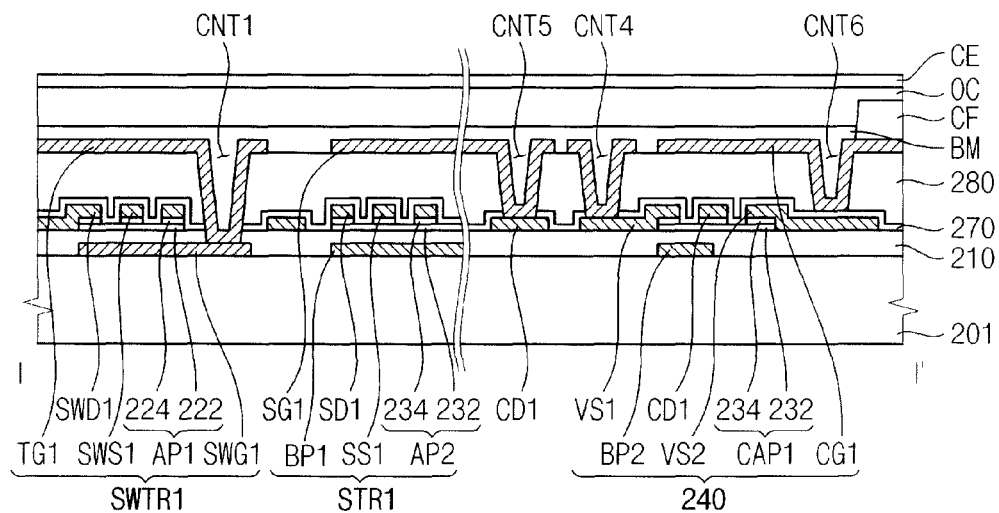
FIG. 4 is a cross-sectional view taken along line I-I' of FIG. 2.
Figure 5:
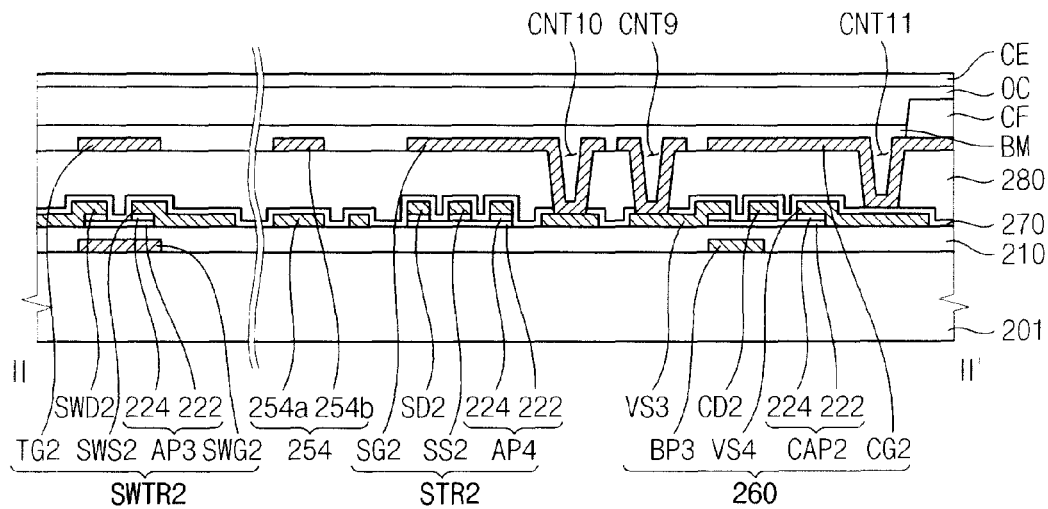
FIG. 5 is a cross-sectional view taken along line II-II' of FIG. 2.

FIG. 2 is a top plan view of an exemplary embodiment of the touch substrate of FIG. 1. FIG. 3 is an equivalent circuit diagram illustrating the touch substrate of FIG. 2. FIG. 4 is a cross-sectional view taken along line I-I' of FIG. 2. FIG. 5 is a cross-sectional view taken along line II-II' of FIG. 2.

Referring to FIGS. 2 to 5, the touch substrate 200 may include a first sensing gate line SGL1, a first bias voltage line BVL1, a second bias voltage line BVL2, a first read out line ROL1, a first light sensing part LSP1 (FIG. 1), a first light blocking pattern BP1, a first variable voltage part 240 and a first capacitor 252.

The first sensing gate line SGL1 extends substantially in a first direction and transmits a first sensing gate signal.

The first bias voltage line BVL1 extends substantially in a second direction crossing the first direction and transmits a first bias voltage. The second bias voltage line BVL2 extends substantially in the second direction and transmits a second bias voltage.

The first read out line ROL1 extends substantially in the second direction. The first read out line ROL1 applies a reference voltage to a first switching element SWTR1 of the first light sensing part LSP1 in a frame, and reads out a sensing signal from the first sensing element STR1 of the first light sensing part LSP1 in a subsequent frame.

The first light sensing part LSP1 includes the first sensing element STR1 and the first switching element SWTR1.

The first switching element SWTR1 may include a first switching gate electrode SWG1, a first active pattern An a first switching source electrode SWS1 and a first switching drain electrode SWD1. The first switching gate electrode SWG1 is electrically connected to the first sensing gate line SGL1. The first active pattern AP1 is disposed overlapping the first switching gate electrode SWG1. The gate insulating layer 210 is disposed between the first active pattern AP1 and the first switching gate electrode SWG1. The first active pattern AP1 may include a first semiconductor layer 222 and a first ohmic contact layer 224. The first semiconductor layer 222 may include an amorphous silicon ("a-Si"), and the first ohmic contact layer 224 may include an N+ hydrogenated amorphous silicon ("n+ a-Si") doped with N type dopants at a high concentration. The first switching source and drain electrodes SWS1 and SWD1 are disposed apart from each other on the first active pattern AP1. The first switching drain electrode SWD1 is electrically connected to the first read out line ROL1.

In an exemplary embodiment, the first switching element SWTR1 may further include a first top gate electrode TG1. The first top gate electrode TG1 may be electrically connected to the first switching gate electrode SWG1 through a first contact hole CNT1. The first top gate electrode TG1 is electrically connected to the first bias voltage line BVL1 to receive a first bias voltage. The first switching element SWTR1 may have a double gate structure including the first switching gate electrode SWG1 and the first top gate electrode TG1.

The first sensing element STR1 senses a first light, e.g., infrared light. The first sensing element STR1 includes a second active pattern AP2, a first sensing source electrode SS1, a first sensing drain electrode SD1 and a first sensing gate electrode SG1. The second active pattern AP2 may include a second semiconductor layer 232 and a second ohmic contact layer 234. In an exemplary embodiment, the second semiconductor layer 232 may include an a-SiGe, and the second ohmic contact layer 234 may include an n+ a-Si doped with N type dopants at a high concentration. The first sensing source and drain electrodes SS1 and SD1 are disposed apart from each other on the second active pattern AP2. The first sensing source electrode SS1 is electrically connected to the second bias voltage line BVL2 through a second contact hole CNT2. The first sensing drain electrode SD1 is electrically connected to the first switching source electrode SWS1. In an exemplary embodiment, each of the first sensing source electrode SS1 and the first sensing drain electrode SD1 may include a zigzag pattern having a repeating U-shaped pattern to increase a channel region of the first sensing element STR1. The first sensing gate electrode SG1 is disposed on the first sensing source and drain electrodes SS1 and SD1.

The first light blocking pattern BP1 is disposed under the first sensing element STR1. The first light blocking pattern BP1 may include a semiconductor. In an exemplary embodiment, the first light blocking pattern BP1 may include the a-SiGe. The first light blocking pattern BP1 transmits infrared light, and blocks visible light by absorbing the visible light. The first light blocking pattern BP1 may be electrically connected to the first sensing gate electrode SG1 through a third contact hole CNT3. Thus, the first sensing element STR1 may have a double gate structure including the first sensing gate electrode SG1 and the first light blocking pattern BP1.

The first variable voltage part 240 is electrically connected to the first sensing gate electrode SG1. The first variable voltage part 240 provides at least one of a first sensing gate voltage and a second sensing gate voltage to the first sensing gate electrode SG1 based on receiving the first light, e.g., the infrared light. A level of the second sensing gate voltage is higher than a level of the first sensing gate voltage. In an exemplary embodiment, when the infrared light is not received, the first variable voltage part 240 may provide the first sensing gate voltage to the first sensing gate electrode SG1. When the infrared light is received, the first variable voltage part 240 may provide the second sensing gate voltage to the first sensing gate electrode SG1. In an exemplary embodiment, the first sensing gate voltage may have a negative (−) level. In an exemplary embodiment, the second sensing gate voltage may have a level between about 0V to about 5V.

The first variable voltage part 240 may include a first common active pattern CAP1, a first variable source electrode VS1, a first common drain electrode CD1, a second variable source electrode VS2, a first common gate electrode CG1 and a second light blocking pattern BP2. The first common active pattern CAP1 may include the second semiconductor 232 and the second ohmic contact layer 234. The first variable source electrode VS1 is disposed on the first common active pattern CAP1, and electrically connected to the first bias voltage line BVL1 through a fourth contact hole CNT4. The first common drain electrode CD1 is spaced apart from the first variable source electrode VS1, and electrically connected to the first sensing gate electrode SG1 through a fifth contact hole CNT5. The second variable source electrode VS2 is spaced apart from the first common drain electrode CD1, and electrically connected to the second bias voltage line BVL2 through a sixth contact hole CNT6. The first common gate electrode CG1 is disposed on the first variable source electrode VS1, the first common drain electrode CD1 and the second variable source electrode VS2, and dispose overlapping the first common active pattern CAP1. The first common gate electrode CG1 is electrically connected to the second variable source electrode VS2 through the sixth contact hole CNT6. In one example embodiment, the first common gate electrode CG1 may be electrically connected to an additional signal line to receive a gate signal.

A first photo resistance switching element LRT1 (in FIG. 3) is collectively defined by the first common active pattern CAP1, the first variable source electrode VS1, the first common drain electrode CD1 and the first common gate electrode CG1. A second photo resistance switching element LRT2 (in FIG. 3) is collectively defined by the first common active pattern CAP1, the second variable source electrode VS2, the first common drain electrode CD1 and the first common gate electrode CG1. Thus, the first variable voltage part 240 may have a structure including the first and second photo resistance switching elements LTR1 and LTR2 connected to the first sensing gate electrode SG1 in parallel.

A sensing gate voltage applied to the first sensing gate electrode SG1 may be defined as Equation 1 as follows.

$$V_G = \frac{R2}{R1+R2}(V_{B1} - V_{B2}) + V_S \quad \langle\text{Equation 1}\rangle$$

Herein, $V_G$ is the sensing gate voltage, R1 is a resistance of the first photo resistance switching element LRT1, R2 is a resistance of the second photo resistance switching element LRT2, $V_{B1}$ is a first bias voltage applied to the first variable source electrode VS1, $V_{B2}$ is a second bias voltage applied to the second variable source electrode VS2, and $V_S$ is a source voltage applied to the first sensing source electrode SS1 of the first sensing element STR1.

The second light blocking pattern BP2 is disposed under the first photo resistance switching element LRT1. The second light blocking pattern BP2 blocks the infrared light irradiated to the first photo resistance switching element LRT1. Thus, the resistance R1 of the first photo resistance switching element LRT1 may be substantially uniformly maintained. The resistance R2 of the second photo resistance switching element LRT2 may be decreased substantially proportionally to the infrared light irradiated to the second photo resistance switching element LTR2. When the infrared light is not received, the resistances R1 and R2 of the first and second photo resistance switching elements LTR1 and LTR2 may be substantially equal to each other.

Each of the first and second photo resistance switching elements LTR1 and LTR2 may have a ratio of width to length (W/L) relatively less than a ratio of width to length (W/L) of the first sensing element STR1. In an exemplary embodiment, the ratio of width to length (W/L) of each of the first and second photo resistance switching elements LTR1 and LTR2 may be in a range from about 1 to about 10.

The first capacitor 252 is collectively defined by a first electrode 252a electrically connected to the first sensing drain electrode SD1, a second electrode 252b electrically connected to the second bias voltage line BVL2, a passivation layer 270 disposed between the first and second electrodes 252a and 252b, and a dielectric layer including an organic layer 280. The first capacitor 252 charges an electric charge generated by the infrared light irradiated to the second active pattern AP2 of the first sensing element STR1.

Hereinafter, a process of sensing the infrared light by the first switching element SWTR1 and the first sensing element STR1 will be described in detail.

When the first switching element SWTR1 is turned on, the first capacitor 252 is charged by a reference voltage applied from the first read out voltage ROL1. When the infrared light is irradiated to the first active pattern AP1 of the first sensing element STR1, a photo current flows through the first sensing source and drain electrodes SS1 and SD1, and a voltage charged at the first capacitor 252 is thereby discharged. The voltage charged at the first capacitor 252 is transmitted to a read out driver (not shown) through the first read out line ROL1 when the first switching element SWTR1 is turned on in a subsequent frame. The read out driver detects an intensity of the light sensed by the first sensing element STR1 using the voltage charged at the first capacitor 252 and the reference voltage. A touch determining part (not shown) electrically connected to the read out driver determines a touch position based on the intensity of the light sensed by the first sensing element STR1.

The touch substrate 200 may further include a second sensing gate line SGL2, a second read out line ROL2, a second light sensing part LSP2, a second variable voltage part 260 and a second capacitor 254. The second light sensing part LSP2 includes the second switching element SWTR2 and the second sensing element STR2.

The second sensing gate line SGL2 extends substantially in the first direction and substantially parallel to the first sensing gate line SGL1. The second sensing gate line SGL2 applies a second sensing gate signal.

The second read out line ROL2 extends substantially in the second direction. The second read out line ROL2 applies the reference voltage to a second switching element SWTR2 in a frame, and reads out a sensing signal sensed by the second sensing element STR2 in a subsequent frame.

The second switching element SWTR2 may include a second switching gate electrode SWG2, a third active pattern AP3, a second switching source electrode SWS2 and a second switching drain electrode SWD2. The second switching gate electrode SWG2 is electrically connected to the second sensing gate line SGL2. The third active pattern AP3 overlaps the second switching gate electrode SWG2. The gate insulating layer 210 is disposed between the third active pattern AP3 and the second switching gate electrode SWG2. The third active pattern AP3 may include the first semiconductor layer 222 and the first ohmic contact layer 224. The second switching source and drain electrodes SWS2 and SWD2 are disposed apart from each other on the third active pattern AP3. The second switching drain electrode SWD2 is electrically connected to the second read out line ROL2.

The second switching element SWTR2 may further include a second top gate electrode TG2. The second top gate electrode TG2 may be electrically connected to the second switching gate electrode SWG2 through a seventh contact hole CNT7. Thus, the second switching element SWTR2 may have a double gate structure including the second switching gate electrode SWG2 and the second top gate electrode TG2.

The second sensing element STR2 senses the visible light. The second sensing element STR2 includes fourth active pattern AP4, a second sensing source electrode SS2, a second sensing drain electrode SD2 and a second sensing gate electrode SG2. The fourth active pattern AP4 may include the first semiconductor layer 222 and the second ohmic contact layer 224. The second sensing source and drain electrodes SS2 and SD2 are disposed apart from each other on the fourth active pattern AP4. The second sensing source electrode SS2 is electrically connected to the second bias voltage line BVL2 through an eighth contact hole CNT8. The second sensing drain electrode SD2 is electrically connected to the second switching source electrode SWS2. Each of the second sensing source electrode SS2 and the second sensing drain electrode SD2 may include a zigzag pattern having a repeating U-shaped pattern to increase a channel region of the second sensing element STR2. The second sensing gate electrode SG2 is disposed on the second sensing source and drain electrodes SS2 and SD2.

The second variable voltage part 260 is electrically connected to the second sensing gate electrode SG2. The second variable voltage part 260 provides a variable sensing gate voltage to the second sensing gate electrode SG2 based on reception of the visible light. In an exemplary embodiment, when the visible light is not received, the second variable voltage part 260 may provide the first sensing gate voltage to the second sensing gate electrode SG2. When the visible light is received, the second variable voltage part 260 may provide the second sensing gate voltage to the second sensing gate electrode SG2.

The second variable voltage part 260 may include a second common active pattern CAP2, a third variable source electrode VS3, a second common drain electrode CD2, a fourth variable source electrode VS4, a second common gate electrode CG2 and a third light blocking pattern BP3. The second common active pattern CAP2 may include the first semiconductor 222 and the first ohmic contact layer 224. The third variable source electrode VS3 is disposed on the second common active pattern CAP2, and electrically connected to the first bias voltage line BVL1 through a ninth contact hole CNT9. The second common drain electrode CD2 is spaced apart from the third variable source electrode VS3, and electrically connected to the second sensing gate electrode SG2 through a tenth contact hole CNT10. The fourth variable source electrode VS4 is spaced apart from the second common drain electrode CD2, and electrically connected to the second bias voltage line BVL2 through an eleventh contact hole CNT11. The second common gate electrode CG2 is disposed on the third variable source electrode VS3, the second common drain electrode CD2 and the fourth variable source electrode VS4, and disposed overlapping the second common active pattern CAP2. The second common gate electrode CG2 is electrically connected to the fourth variable source electrode VS4 through the eleventh contact hole CNT11. In an example embodiment, the second common gate electrode CG2 may be electrically connected to an additional signal line to receive a gate signal.

A third photo resistance switching element LRT3 (in FIG. 3) is collectively defined by the second common active pattern CAP2, the third variable source electrode VS3, the second common drain electrode CD2 and the second common gate electrode CG2. A fourth photo resistance switching element LRT4 (in FIG. 3) is collectively defined by the second common active pattern CAP2, the fourth variable source electrode VS4, the second common drain electrode CD2 and the second common gate electrode CG2. Thus, the second variable voltage part 260 may have a structure including the third and fourth photo resistance switching elements LTR3 and LTR4 connected to the second sensing gate electrode SG2 in parallel.

The third light blocking pattern BP3 is disposed under the third photo resistance switching element LTR3. The third light blocking pattern BP3 blocks the visible light irradiated to the third photo resistance switching element LTR3. Thus, a resistance of the third photo resistance switching element LTR3 is substantially uniformly maintained. A sensing gate voltage divided by the third and fourth photo resistance switching elements LTR3 and LTR4 is applied to the second sensing gate electrode SG2 of the second sensing element STR2.

Each of The third and fourth photo resistance switching elements LTR3 and LTR4 may have a ratio of width to length (W/L) relatively less than a ratio of width to length (W/L) of the second sensing element STR2. In an exemplary embodiment, the ratio of width to length (W/L) of each of the third and fourth photo resistance switching elements LTR3 and LTR4 may be in a range from about 1 to about 10.

The second capacitor 254 is collectively defined by a first electrode 254a electrically connected to the second sensing drain electrode SD2, a second electrode 254b electrically connected to the second bias voltage line BVL2, the passivation layer 270 disposed between the first and second electrodes 254a and 254b, and the dielectric layer including the organic layer 280. The second capacitor 254 charges an electric charge generated by the visible light irradiated to the fourth active pattern AP4 of the second sensing element STR2.

Hereinafter, a process of sensing the visible light by the second switching element SWTR2 and the second sensing element STR2 will be described in detail.

When the second switching element SWTR2 is turned on, the second capacitor 254 is charged by the reference voltage applied from the second read out voltage ROL2. When the visible light is irradiated to the third active pattern AP3 of the second sensing element STR2, a photo current flows through the second sensing source and drain electrodes SS2 and SD2, and a voltage charged at the second capacitor 254 is thereby discharged. The voltage charged at the second capacitor 254 is transmitted to the read out driver (not shown) through the second read out line ROL2 when the second switching element SWTR2 is turned on in a subsequent frame. The touch determining part (not shown) electrically connected to the read out driver determines a touch position based on the light intensity sensed by the second sensing element STR2.

The touch substrate 200 may further include a black matrix BM, a color filter layer CF, an overcoat layer OC and a common electrode CE.

The black matrix BM is disposed in peripheral areas between pixel areas R, G and B defined in the second base substrate 201, and blocks a light leakage.

The color filter layer CF is disposed in the pixel areas R, G and B. The color filter layer CF may include a red color filter, a green color filter and a blue color filter.

The overcoat layer OC is disposed on the second base substrate 201 on which the color filter layer is disposed.

The common electrode CE is disposed on the overcoat layer OC. The common electrode CE is disposed substantially in an entire surface of the touch substrate 200.

FIGS. 6A to FIG. 6F are cross-sectional views illustrating an exemplary embodiment of a method of manufacturing the touch substrate of FIG. 4.

Figure 6A:
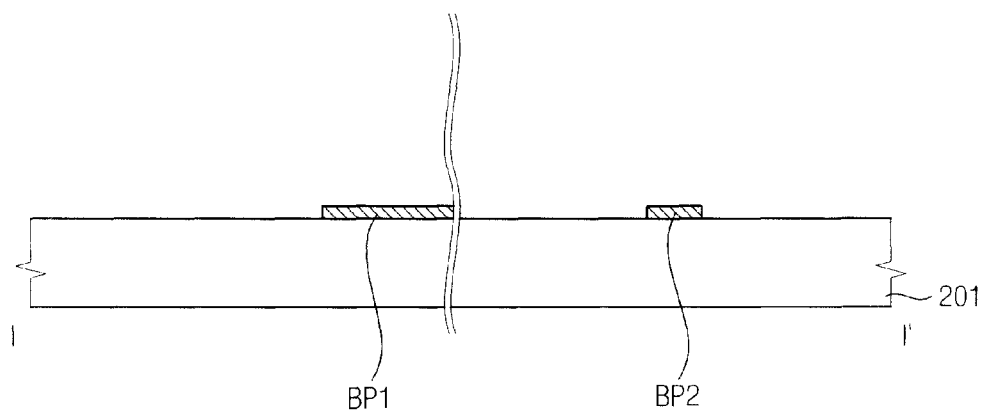
FIGS. 6A to FIG. 6F are cross-sectional views illustrating an exemplary embodiment of a method of manufacturing the touch substrate of FIG. 4.

Referring to FIGS. 4 and 6A, the first light blocking pattern BP1 and the second light blocking pattern BP2 are provided, e.g., formed, on the second base substrate 201. In an exemplary embodiment, a semiconductor layer including an a-SiGe may be formed on the second base substrate 201. The semiconductor layer may be patterned to form the first and second light blocking patterns BP1 and BP2.

Figure 6B:
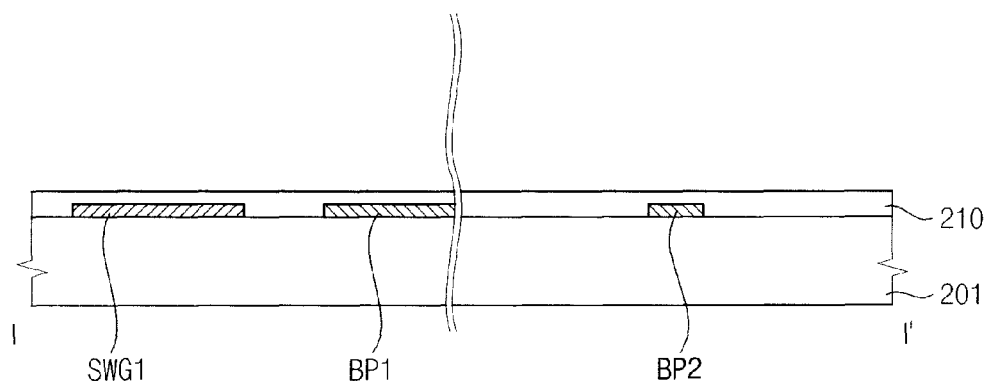

Referring to FIGS. 4 and 6B, a first gate metal pattern including the first switching gate electrode SWG1 is provided, e.g., formed, on the second base substrate 201. In an exemplary embodiment, the first gate metal layer may be formed on the second base substrate 201, and then patterned to form the first gate metal pattern.

Then, the gate insulating layer 210 is provided, e.g., formed, on the second base substrate 201 on which the first and second light blocking patterns BP1 and BP2 and the gate metal pattern are disposed.

Figure 6C:
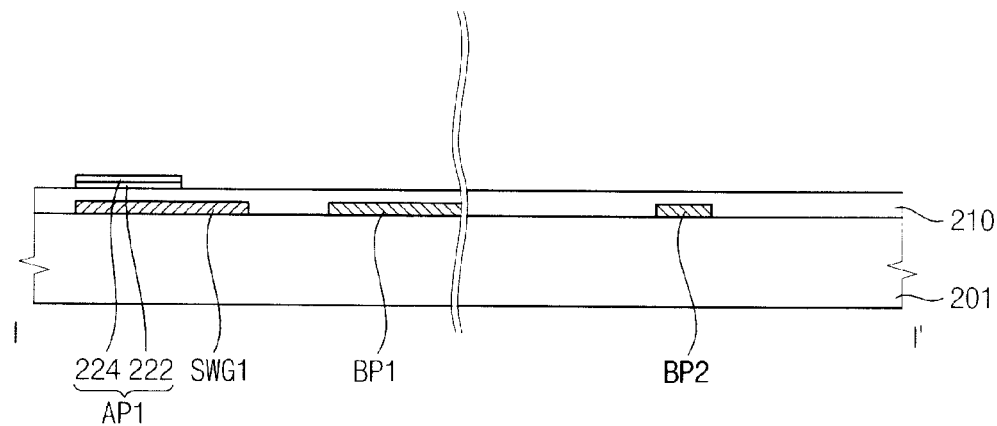

Referring to FIGS. 4 and 6C, the first active pattern AP1 is provided, e.g., formed, on the second base substrate 201 on which the gate insulating layer 210 is disposed. In an exemplary embodiment, the first semiconductor layer 222 and the first ohmic contact layer 224 may be formed on the second base substrate 201. The first semiconductor layer 222 and the first ohmic contact layer 224 may be patterned to form the first active pattern AP1. The first active pattern AP1 is disposed overlapping the first switching gate electrode SWG1.

Figure 6D:
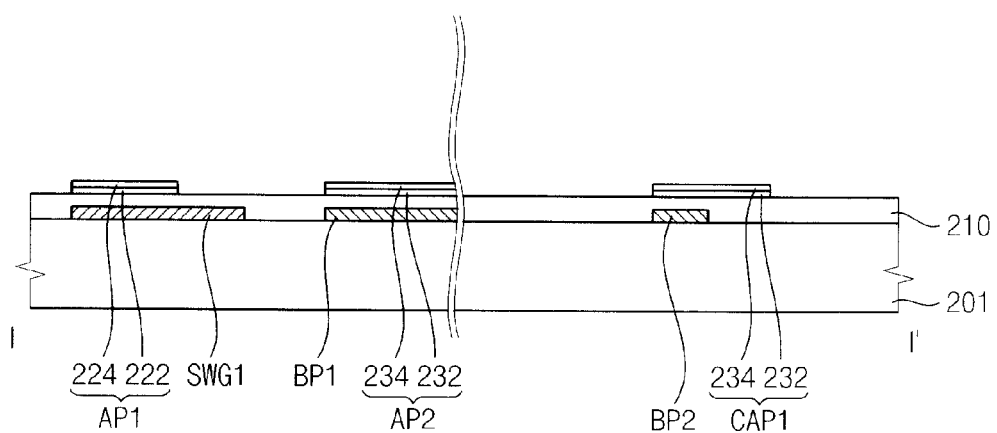

Referring to FIGS. 4 and 6D, the second active pattern AP2 and the first common active pattern CAP1 are provided, e.g., formed, on the second base substrate 201 on which the gate insulating layer 210 is disposed. In an exemplary embodiment, the second semiconductor layer 232 and the second ohmic contact layer 234 may be formed on the second base substrate 201. The second semiconductor layer 232 and the second ohmic contact layer 234 may be patterned to form the second active pattern AP2 and the first common active pattern CAP1. The second active pattern AP2 is disposed overlapping the first light blocking pattern BP1, and the first common active pattern CAP1 is disposed overlapping the second light blocking pattern BP2.

Figure 6E:
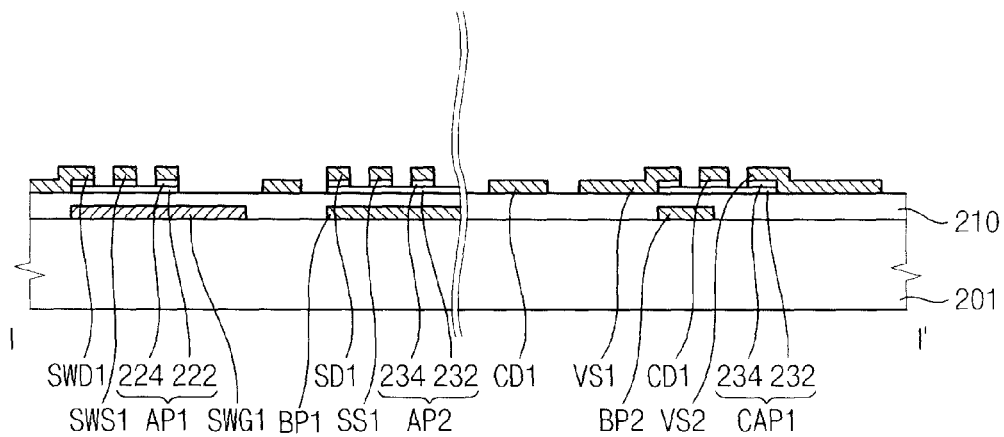

Referring to FIGS. 4 and 6E, a source metal layer is provided, e.g., formed, on the second base substrate 201 on which the first and second active patterns AP1 and AP2 and the first common active pattern CAP1 are disposed. In an exemplary embodiment, the source metal layer is patterned to form a source metal pattern. The source metal pattern includes the first switching source and drain electrodes SWS1 and SWD1, the first sensing source and drain electrodes SS1 and SD1, the first and second variable source electrodes VS1 and VS2, and the first common drain electrode CD1.

Figure 6F:
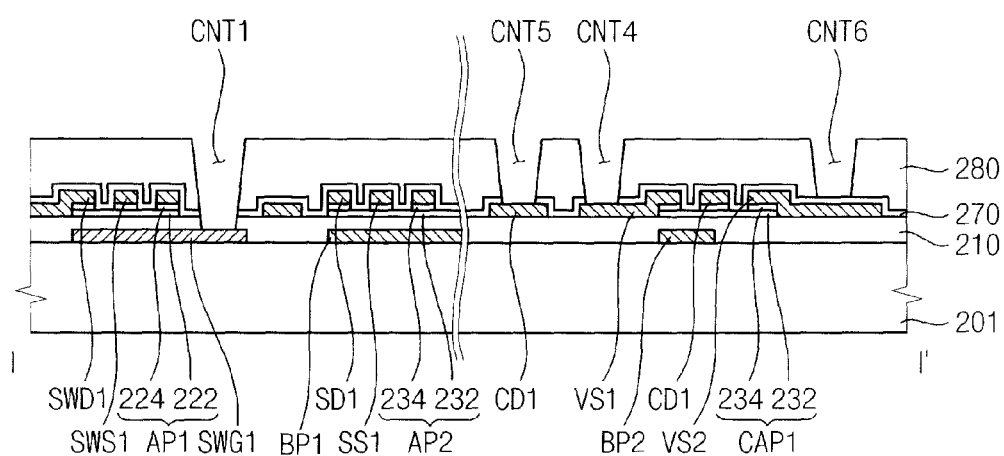

Referring to FIGS. 4 and 6F, the passivation layer 270 and the organic layer 280 are sequentially provided, e.g., formed, on the second base substrate on which the source metal pattern is disposed. Then, portions of the gate insulating layer, the passivation layer 270 and the organic layer 280 on the first switching gate electrode SWG1 are removed to form the first contact hole CNT1. Portions of the passivation layer 270 and the organic layer 280 on the second variable source electrode VS2 are removed to form the fourth contact hole CNT4. Portions of The passivation layer 270 and the organic layer 280 on the first common drain electrode CD1 are removed to form the fifth contact hole CNT5. Portions of the passivation layer 270 and the organic layer 280 on the second variable source electrode VS2 are removed to form the sixth contact hole CNT6.

Then, a second gate metal layer is provided, e.g., formed, on the second base substrate 201 on which the first, fourth, fifth and sixth contact holes CNT1, CNT4, CNT5 and CNT6 are formed. In an exemplary embodiment, the second gate metal layer is patterned to form a second gate metal pattern. The second gate metal pattern may include the first top gate electrode TG1, the first sensing gate electrode SG1 and the first common gate electrode CG1.

The black matrix BM, the color filter layer CF, the overcoat layer OC and the common electrode CE are provided, e.g., formed, on the base substrate 201 on which the second gate metal pattern is disposed. As described above, an exemplary embodiment of the touch substrate 200 may be manufactured.

Processes to provide the second switching element SWTR2, the second sensing element STR2 and the second variable voltage part 260 are substantially the same as the processes described referring to FIGS. 6A to 6F except for a material of the semiconductor layer of the third and fourth active patterns AP3 and AP4. Thus, any repetitive detailed description thereof will be omitted or simplified.

In an exemplary embodiment, the third and fourth active patterns AP3 and AP4 and the second common active pattern CAP2, which are parts of the second switching element SWTR2, the second sensing element STR2 and the second variable voltage part 260 include the same semiconductor material. Thus, the third and fourth active patterns AP3 and AP4 and the second common active pattern CAP2 may be formed using a single mask.

In an example embodiment, the sensing gate voltage applied to the first or second sensing gate electrodes SG1 or SG2 may be controlled using the first and second variable voltage part 240 and 260. When the infrared light or the visible light is irradiated, the sensing gate voltage may be increased so that the photo currents of the first and second sensing elements STR1 and STR2 are increased. Therefore, the sensitivity of the first and second sensing elements STR1 and STR2 is substantially improved.

Figure 7:
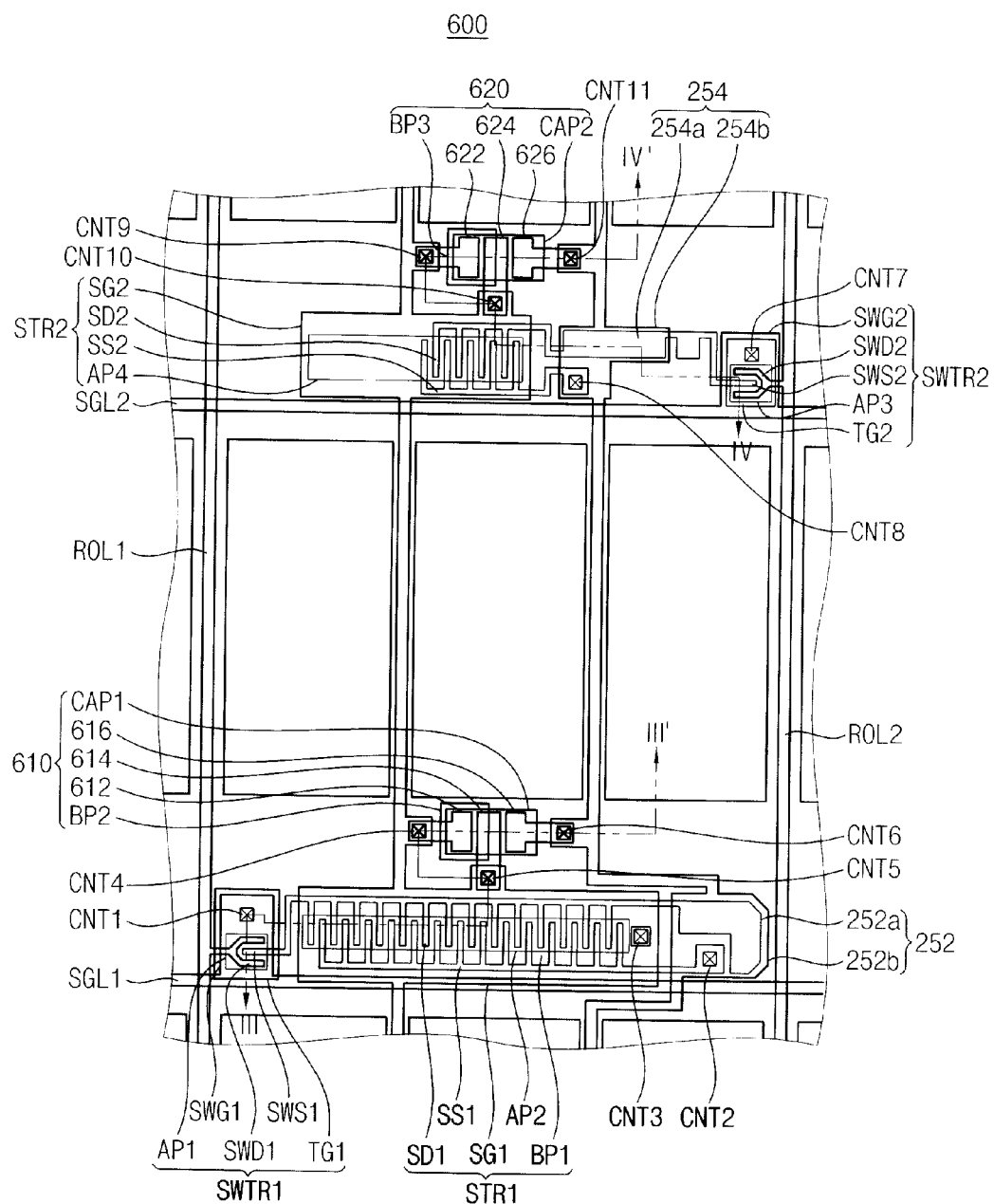
FIG. 7 is a top plan view of an alternative exemplary embodiment of the touch substrate according to the present invention.
Figure 8:
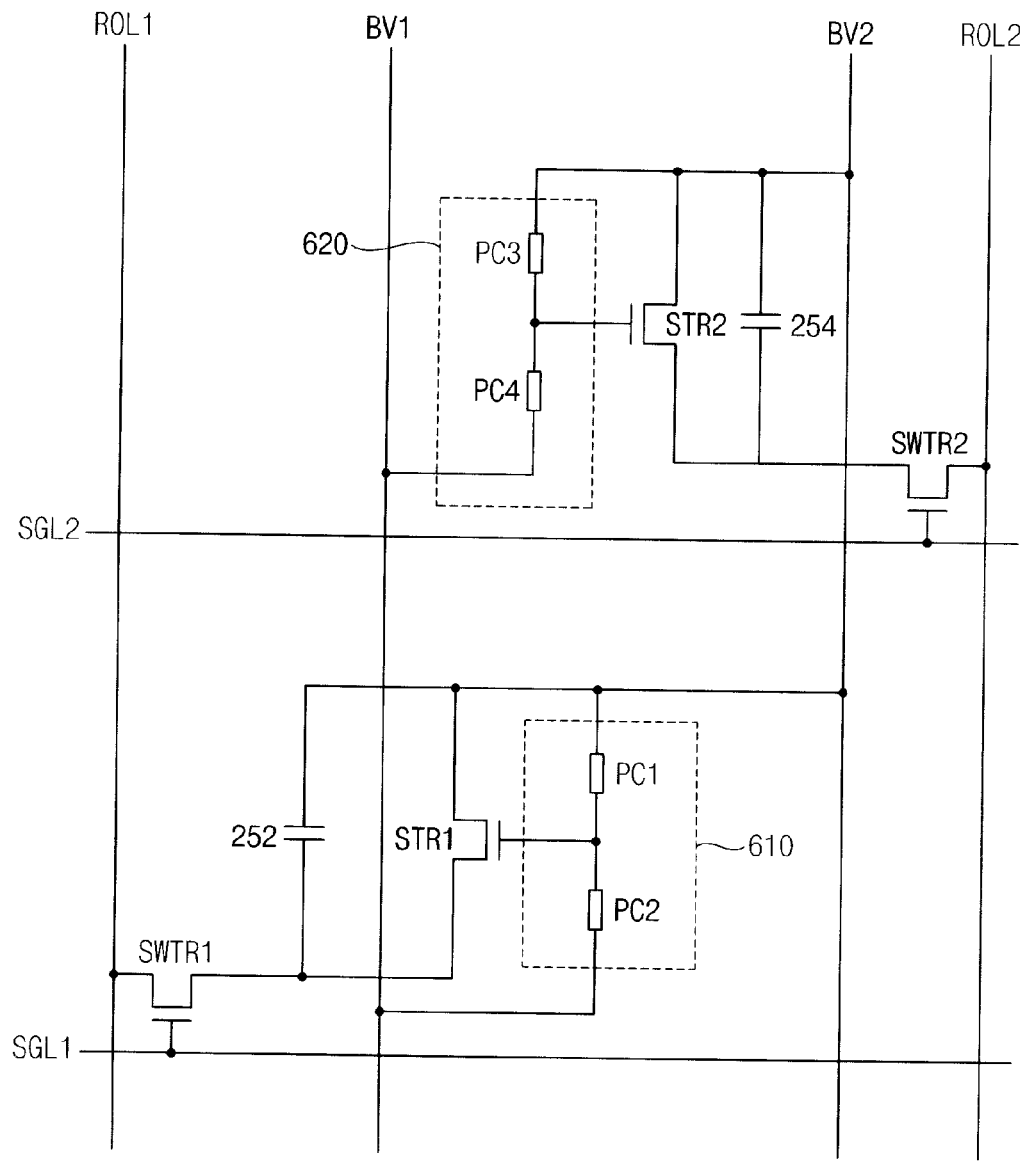
FIG. 8 is an equivalent circuit diagram illustrating the touch substrate of FIG. 7.
Figure 9:
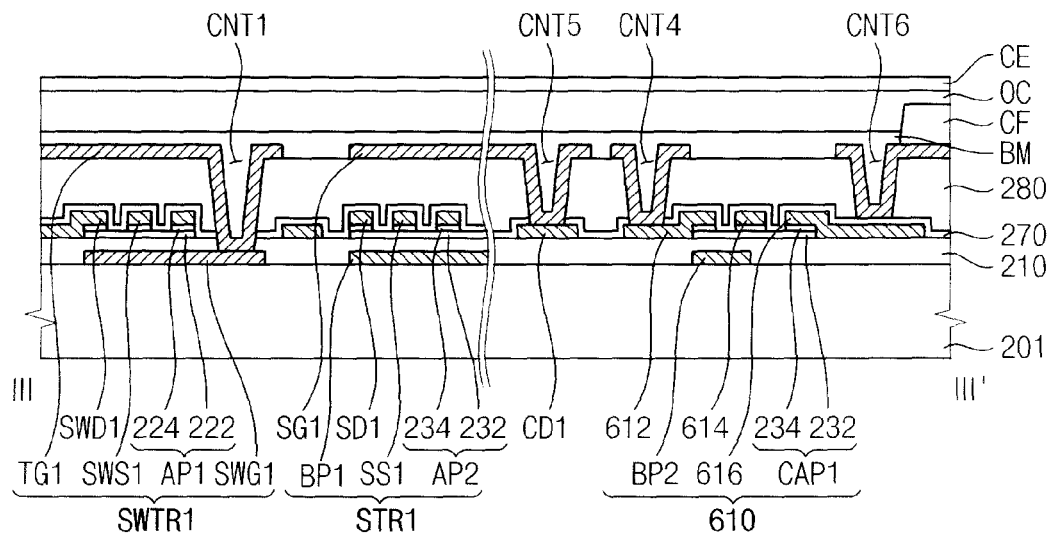
FIG. 9 is a cross-sectional view taken along line of FIG. 7.
Figure 10:
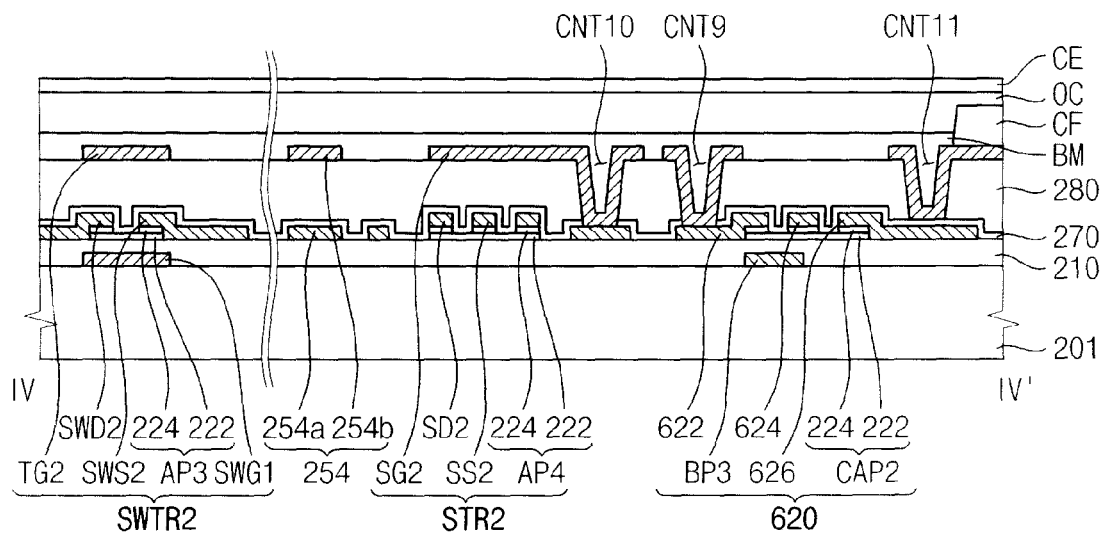
FIG. 10 is a cross-sectional view taken along line IV-IV' of FIG. 7.

FIG. 7 is a top plan view of an alternative exemplary embodiment of the touch substrate according to the present invention. FIG. 8 is an equivalent circuit diagram illustrating the touch substrate of FIG. 7. FIG. 9 is a cross-sectional view taken along line III-III' of FIG. 7. FIG. 10 is a cross-sectional view taken along line IV-IV' of FIG. 7.

An alternative exemplary embodiment of the display apparatus including the touch substrate in FIG. 7 is substantially the same as the display apparatus 1000 shown in FIG. 1 except for the touch substrate 600. Thus, the same reference numerals will be used for the same elements except for the touch substrate 200. The touch substrate 600 in FIG. 7 is substantially the same as the touch substrate 200 shown in FIG. 2 except for a first variable voltage part 610 and a second variable touch substrate 620. Thus, the same or like elements shown in FIG. 7 have been labeled with the same reference characters as used above to describe the exemplary embodiment of the touch substrate 200 in FIG. 2, and any repetitive detailed description thereof will hereinafter be omitted or simplified.

Referring to FIGS. 7, 8 and 9, an exemplary embodiment of the touch substrate 600 includes a first switching element SWTR1, a first sensing element STR1, the first variable voltage part 610, a second switching element SWTR2, a second sensing element STR2 and the second variable voltage part 620.

The first variable voltage part 610 is electrically connected to a first sensing gate electrode SG1 of the first sensing element STR1 to provide a variable gate voltage.

The first variable voltage part 610 may include a first common active pattern CAP1, a first input electrode 612, a first common output electrode 614, a second input electrode 616 and a second light blocking pattern BP2. The first common active pattern CAP1 may be disposed under the first input electrode 612, the first common output electrode 614 and the second input electrode 616. The first common active pattern CAP1 includes a second semiconductor layer 232 and a second ohmic contact layer 234. The second semiconductor layer 232 may include the a-SiGe, and the second ohmic contact layer 234 may include the n+ a-Si. The first input electrode 612 is electrically connected to a first bias voltage line BVL1 through a fourth contact hole CNT4 to receive a first bias voltage. The first common output electrode 614 is disposed apart from the first and second input electrodes 612 and 616 between the first and second input electrodes 612 and 616. The first common output electrode is electrically connected to the first sensing gate electrode SG1 through a fifth contact hole CNT5. The second input electrode 616 is electrically connected to the second bias voltage line BVL2 through a sixth contact hole CNT6 to receive a second bias voltage.

A first photo conductor PC1 (in FIG. 8) is collectively defined by the first common active pattern CAP1, the first input electrode 612, and the first common output electrode 614. A second photo conductor PC2 (in FIG. 8) is collectively defined by the first common active pattern CAP1, the second input electrode 616 and the first common output electrode 614. In an exemplary embodiment, the first variable voltage part 610 may have a structure including the first and second photo conductors PC1 and PC2 connected to the first sensing gate electrode SG1 in parallel.

The second light blocking pattern BP2 is disposed under the first photo conductor PC1. The second light blocking pattern BP2 blocks the infrared light irradiated to the first photo conductor PC1. Thus, a resistance of the first photo conductor PC1 is substantially uniformly maintained. A resistance of the second photo conductor PC2 is decreased substantially in proportion to an amount of the infrared light irradiated to the second photo conductor PC2.

The second variable voltage part 620 is electrically connected to a second sensing gate electrode SG2 of the second sensing element STR2 to provide a variable sensing gate voltage.

The second variable voltage part 620 may include a second common active pattern CAP2, a third input electrode 622, a second common output electrode 624, a fourth input electrode 626 and a third light blocking pattern BP3. The second common active pattern CAP2 may be disposed under the third input electrode 622, the second common output electrode 624 and the fourth input electrode 626. The second common active pattern CAP2 includes a first semiconductor layer 222 and a first ohmic contact layer 224. The first semiconductor layer 222 may include the a-Si, and the first ohmic contact layer 224 may include the n+ a-Si. The third input electrode 622 is electrically connected to the first bias voltage line BVL1 through a ninth contact hole CNT9 to receive the first bias voltage. The second common output electrode 624 is disposed apart from the third and fourth input electrodes 622 and 626 between the third and fourth input electrodes 622 and 626. The second common output electrode is electrically connected to the first sensing gate electrode SG1 through a tenth contact hole CNT10. The fourth input electrode 616 is electrically connected to the second bias voltage line BVL2 through an eleventh contact hole CNT11 to receive the second bias voltage.

A third photo conductor PC3 (in FIG. 8) is collectively defined by the second common active pattern CAP2, the third input electrode 622, and the second common output electrode 624. A fourth photo conductor PC2 (in FIG. 8) is collectively defined by the second common active pattern CAP2, the fourth input electrode 626 and the second common output electrode 624. In an exemplary embodiment, the second variable voltage part 620 may have a structure including the third and fourth photo conductors PC3 and PC4 connected to the second sensing gate electrode SG2 in parallel.

The third light blocking pattern BP3 is disposed under the third photo conductor PC3. The third light blocking pattern BP3 blocks the visible light irradiated to the third photo conductor PC3. Thus, a resistance of the third photo conductor PC3 may be substantially uniformly maintained. A resistance of the fourth photo conductor PC4 is decreased substantially in proportion to an amount of the visible light irradiated to the fourth photo conductor PC4.

An exemplary embodiment of a method of manufacturing the touch substrate 600 in FIG. 7 is substantially the same as the exemplary embodiment of the method of manufacturing the touch substrate 200 shown in FIGS. 6A to 6F except for the first and second variable voltage parts 610 and 620. Thus, any repetitive explanation thereof will hereinafter be omitted or simplified.

As shown in FIG. 6F, a second gate metal pattern is provided, e.g., formed, on the second base substrate 201 after forming the first, fourth, fifth and sixth contact holes CNT1, CNT4, CNT5 and CNT6 on the second base substrate 201. A second gate metal layer is provided, e.g., formed, on the second base substrate on which the first, fourth, fifth and sixth contact holes CNT1, CNT4, CNT5 and CNT6 are formed. The second gate metal layer may be patterned to form the second gate metal pattern. The second gate metal pattern may include the first top gate electrode TG1 and the first sensing gate electrode SG1. The black matrix BM, the color filter layer CF, the overcoat layer OC and the common electrode CE are provided on the base substrate 201 on which the second gate metal pattern is disposed. Therefore, the touch substrate 600 in FIG. 7 may be manufactured as described above.

A structure of the first and second variable voltage parts 610 and 620 of touch substrate in FIG. 7 may be more simplified than a structure of the first and second variable voltage parts 240 and 260 of the touch substrate 200 in FIG. 2.

<Sensing Gate Voltage Characteristic Test>

A sample display apparatus including a first variable voltage part of FIG. 2 was prepared. When a first bias voltage applied to a first variable source electrode of the first variable voltage part was fixed at 5 volt (V) and a second bias voltage applied to a second variable source electrode of the first variable voltage part was varied from −20 V to 20 V, a sensing gate voltage applied to a first sensing gate electrode was measured.

Figure 11:
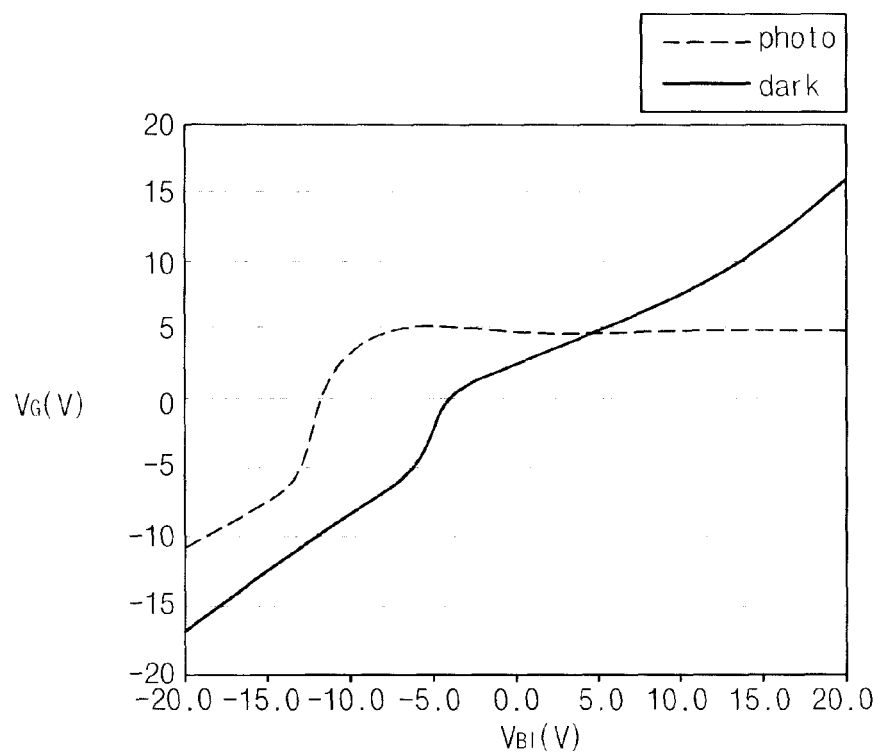
FIG. 11 is a graph illustrating a change of sensing gate voltage of an exemplary embodiment of a first variable voltage part according to a second bias voltage.

FIG. 11 is a graph illustrating a change of the sensing gate voltage (V) of an exemplary embodiment of the first variable voltage part according to the second bias voltage.

In FIG. 11, X axis represents the second bias voltage, and Y axis represents the sensing gate voltage.

Referring to FIG. 11, if the second bias voltage is about −10 V, the sensing gate voltage was about −8.2 V when an infrared light was not received (Hereinafter, it is referred as a "dark status"), and about 3.8 V when the infrared light was received (Hereinafter, it is referred as a "photo status"). When the second bias voltage was about 0 V, the sensing gate voltage was about 3.6 V in the dark status, and about 5 V in the photo status. Accordingly, the first variable voltage part may increase when the infrared light is received.

Figure 12A:
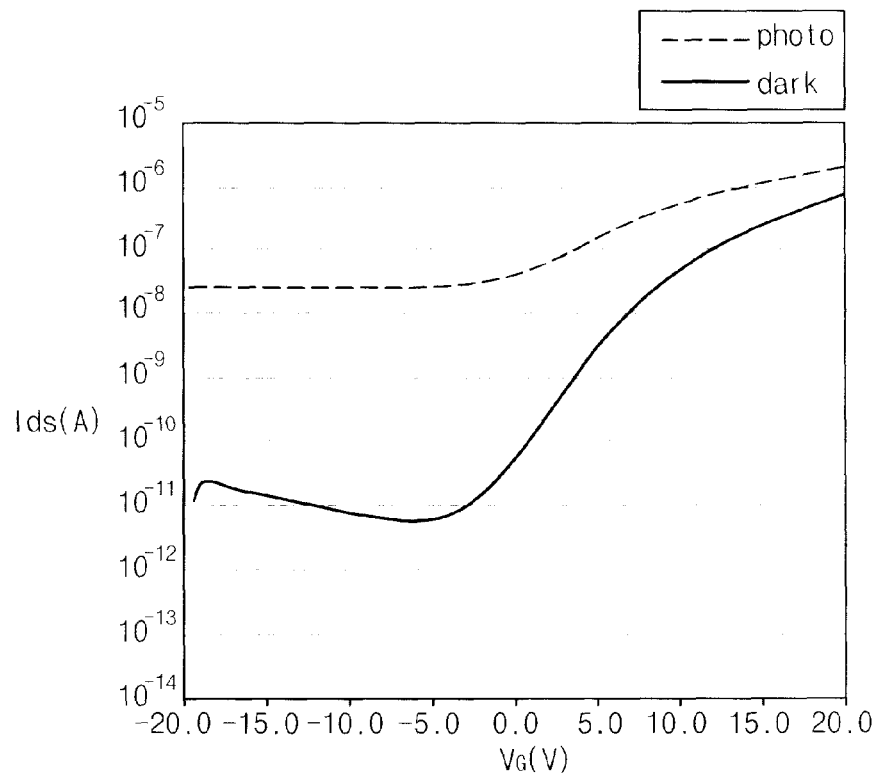
FIGS. 12A and 12B are graphs illustrating a current-voltage characteristic of an exemplary embodiment of the first sensing element.
Figure 12B:
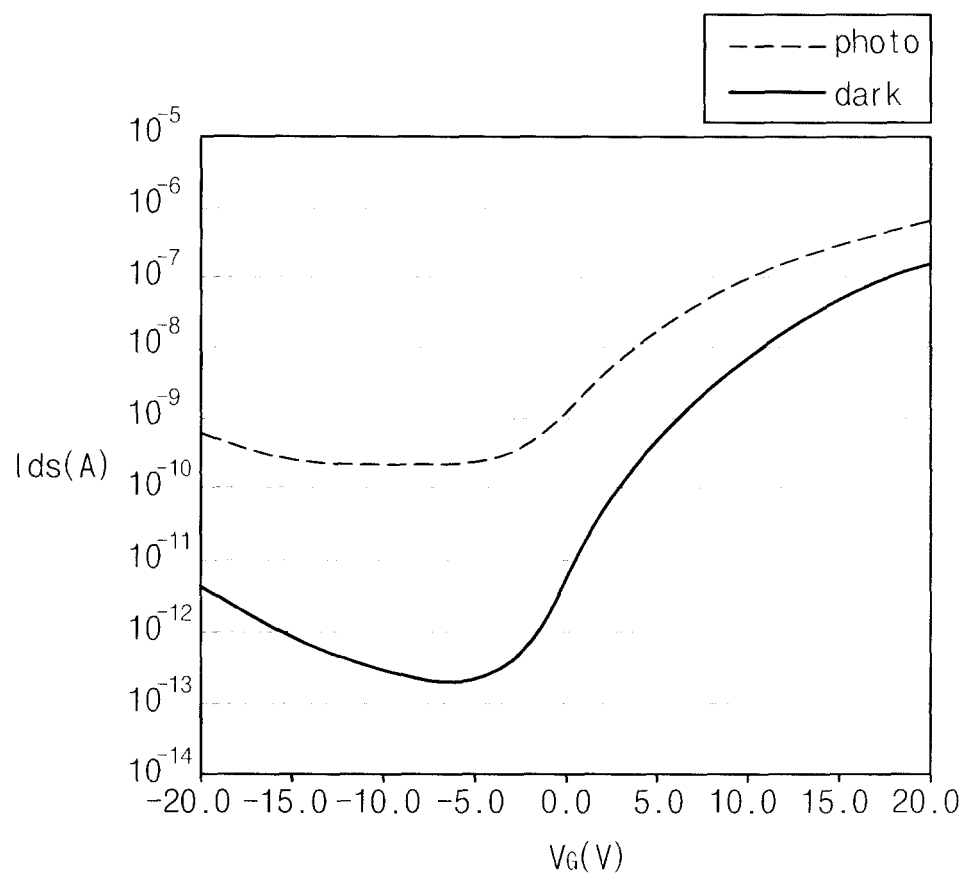

FIGS. 12A and 12B are graphs illustrating a current-voltage characteristic of an exemplary embodiment of the first sensing element.

In FIGS. 12A and 12B, X axis represents the sensing gate voltage, and Y axis represents a drain current of the first sensing element.

In an exemplary embodiment, when the infrared light is not received, the sensing gate voltage of about −6 V is applied to the first sensing gate electrode. When the infrared light is received, the sensing gate voltage of about 4 V is applied to the first sensing gate electrode.

When the first sensing element has the voltage-current characteristic shown in FIG. 12A in the dark and photo statuses, a dark current of the first sensing element is about $7.88 \times 10^{-12}$ ampere (A) in the dark status. When the sensing gate voltage of about −6 V is applied to the first sensing gate electrode, a photo current of the first sensing element is about $4.43 \times 10^{-8}$ A in the photo status. When the sensing gate voltage of about 4 V is applied to the first sensing gate electrode, a photo current of the first sensing element is about $1.24 \times 10^{-7}$ A in the photo status. When the sensing gate voltage of about −6 V is applied to the first sensing gate electrode, a ratio of the photo current to the dark current was about 5,617. When the sensing gate voltage of about 4 V is applied to the first sensing gate electrode, a ratio of the photo current to the dark current was about 15,706. The ratio of the photo current to the dark current of the first sensing element having the voltage-current characteristic of FIG. 12A is increased by about 2.7 times as the sensing gate voltage increases from about −6 V to about 4 V.

When the first sensing element has the voltage-current characteristic shown in FIG. 12B in the dark and photo statuses, a dark current of the first sensing element is about $3.00 \times 10^{-13}$ A in the dark status. When the sensing gate voltage of about −6 V is applied to the first sensing gate electrode, a photo current of the first sensing element is about $3.22 \times 10^{-10}$ A in the photo status. When the sensing gate voltage of about 4 V is applied to the first sensing gate electrode, a photo current of the first sensing element was about $1.82 \times 10^{-8}$ A in the photo status. When the sensing gate voltage of about −6 V is applied to the first sensing gate electrode, a ratio of the photo current to the dark current was about 1,072. When the sensing gate voltage of about 4V is applied to the first sensing gate electrode, a ratio of the photo current to the dark current is about 60,830. The ratio between the photo current and the dark current of the first sensing element having the voltage-current characteristic of FIG. 12B is increased about 56 times as the sensing gate voltage increase from −6 V to 4 V.

As described above, the sensing gate voltage applied to the first and second sensing elements of the illustrated exemplary embodiments may be adjusted to substantially increase a ratio between the dark current in the dark status and the photo current in the photo status. Thus, the sensitivity of the first and second sensing elements may be substantially improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims.

In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific example embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A touch substrate comprising:
   a base substrate;
   a first sensing element which senses a first light, wherein the first sensing element comprises:
      a first active pattern disposed on the base substrate;
      a first sensing source electrode disposed on the first active pattern;
      a first sensing drain electrode disposed on the first active pattern and spaced apart from the first sensing source electrode; and
      a first sensing gate electrode disposed on the first sensing source electrode and the first sensing drain electrode; and
   a first variable voltage part which provides at least one of a first sensing gate voltage and a second sensing gate voltage to the first sensing gate electrode of the first sensing element based on reception of the first light, wherein a level of the second sensing gate voltage is higher than a level of the first sensing gate voltage,
   wherein the first variable voltage part comprises a first variable source electrode, a first common drain electrode and a second variable source electrode spaced apart from one another on a first common active pattern, the first sensing gate electrode electrically connected to the first common drain electrode.

2. The touch substrate of claim 1, wherein
   the first variable voltage part provides the first sensing gate voltage to the first sensing gate electrode when the first light is not received, and
   the first variable voltage part provides the second sensing gate voltage to the first sensing gate electrode to increase a photo current of the first sensing element when the first light is received.

3. The touch substrate of claim 1, further comprising:
   a first switching element comprising:
      a first switching gate electrode;
      a second active pattern disposed on the first switching gate electrode;
      a first switching source electrode disposed on the second active pattern; and
      a first switching drain electrode disposed on the second active pattern and spaced apart from the first switching source electrode;
   a first sensing gate line electrically connected to the first switching gate electrode to transmit a first sensing gate signal to the first switching gate electrode;
   a first bias voltage line electrically connected to the first sensing source electrode to transmit a first bias voltage to the first sensing source electrode; and
   a second bias voltage line electrically connected to the first variable voltage part to transmit a second bias voltage to the first variable voltage part.

4. The touch substrate of claim 3, wherein the first variable voltage part comprising:
   a first light blocking pattern which blocks the first light;
   the first variable source electrode disposed on the first light blocking pattern and electrically connected to the first bias voltage line;

the second variable source electrode electrically connected to the second bias voltage line; and a first common gate electrode disposed on the first variable source electrode, the second variable source electrode and the first common drain electrode and overlapping the first common active pattern.

5. The touch substrate of claim 4, wherein the first common gate electrode is electrically connected to the second variable source electrode to receive the second bias voltage.

6. The touch substrate of claim 3, further comprising:
a second switching element comprising:
a second switching gate electrode;
a third active pattern disposed on the second switching gate electrode;
a second switching source electrode disposed on the third active pattern; and
a second switching drain electrode disposed on the third active pattern and spaced apart from the second switching source electrode;
a second sensing element which senses a second light, wherein the second sensing element comprises:
a second sensing drain electrode electrically connected to the second switching source electrode;
a second sensing source electrode disposed spaced apart from the second sensing drain electrode;
a fourth active pattern disposed under the second sensing drain electrode and the second sensing source electrode; and
a second sensing gate electrode disposed on the second sensing drain electrode and the second sensing source electrode; and
a second variable voltage part which provides at least one of a third sensing gate voltage and a fourth sensing gate voltage to the second sensing gate electrode based on reception of the second light, wherein a level of the fourth sensing gate voltage is higher than a level of the third sensing gate voltage.

7. The touch substrate of claim 6, further comprising:
a second sensing gate line electrically connected to the second switching gate electrode;
a first read out line electrically connected to the first switching drain electrode to output a first sensing signal from the first sensing element; and
a second read out line electrically connected to the second switching drain electrode to output a second sensing signal from the second sensing element.

8. The touch substrate of claim 6, further comprising:
a second light blocking pattern disposed under the first sensing element,
wherein the first light is an infrared light and the second light is a visible light, and
wherein the second light blocking pattern transmits the first light and absorbs the second light.

9. The touch substrate of claim 6, further comprising:
a second light blocking pattern disposed under the second sensing element,
wherein the first light is an visible light and the second light is an infrared light, and
wherein the second light blocking pattern transmits the second light and absorbs the first light.

10. A method of manufacturing a touch substrate, the method comprising:
providing a first light blocking pattern on a base substrate;
providing a first active pattern and a first common active pattern on the base substrate on which the first light blocking pattern is disposed, wherein the first common active pattern is disposed overlapping the first light blocking pattern;
providing a first sensing source electrode and a first sensing drain electrode on the first active pattern, wherein the first sensing source electrode and the first sensing drain electrode are spaced apart from each other;
providing a first variable source electrode, a first common drain electrode and a second variable source electrode on the first common active pattern, wherein the first variable source electrode, the first common drain electrode and the second variable source electrode are spaced apart from one another; and
providing a first sensing gate electrode on the first sensing source electrode and the first sensing drain electrode and electrically connected to the first common drain electrode, and providing a first common gate electrode on the first variable source electrode, the second variable source electrode and the first common drain electrode.

11. The method of claim 10, wherein the first active pattern and the first common active pattern include an amorphous silicon germanium.

12. The method of claim 10, further comprising:
providing a second light blocking pattern on the base substrate before providing the first active pattern and the first common active pattern, and
wherein the second light blocking pattern is disposed overlapping the first active pattern.

13. The method of claim 12, wherein the first light blocking pattern, the second light blocking pattern, the first active pattern and the first common active pattern include an amorphous silicon.

14. The method of claim 10, further comprising:
providing an insulating layer between the first sensing source electrode and the first sensing gate electrode, between the first sensing drain electrode and the first sensing gate electrode, between the first variable source electrode and the first common gate electrode and between the second variable source electrode and the first common gate electrode; and
forming a contact hole on the insulating layer, wherein the contact hole exposes the second variable source electrode, and
wherein the first common gate electrode is connected to the second variable source electrode through the contact hole.

15. A method of manufacturing a touch substrate, the method comprising:
providing a first light blocking pattern on a base substrate;
providing a first active pattern and a first common active pattern on the base substrate on which the first light blocking pattern is disposed, wherein the first common active pattern is disposed overlapping the first light blocking pattern;
providing a first sensing source electrode and a first sensing drain electrode spaced apart from each other on the first active pattern;
providing a first variable source electrode, a first common drain electrode and a second variable source electrode spaced apart from one another on the first common active pattern; and
providing a first sensing gate electrode on the first sensing source electrode and the first sensing drain electrode and electrically connected to the first common drain electrode.

16. The method of claim 15, wherein the first active pattern and the first common active pattern include an amorphous silicon germanium.

17. The method of claim 15, further comprising:
providing a second light blocking pattern on the base substrate before providing the first active pattern and the first common active pattern, and
wherein the second light blocking pattern is disposed overlapping the first active pattern.

18. The method of claim 17, wherein the first light blocking pattern, the second light blocking pattern, the first active pattern and the first common active pattern include an amorphous silicon.

19. A touch substrate comprising:
a base substrate;
a first sensing element which senses a first light, wherein the first sensing element comprises:
a first active pattern disposed on the base substrate;
a first sensing source electrode disposed on the first active pattern;
a first sensing drain electrode disposed on the first active pattern and spaced apart from the first sensing source electrode; and
a first sensing gate electrode disposed on the first sensing source electrode and the first sensing drain electrode; and
a first variable voltage part which provides at least one of a first sensing gate voltage and a second sensing gate voltage to the first sensing gate electrode of the first sensing element based on reception of the first light, wherein a level of the second sensing gate voltage is higher than a level of the first sensing gate voltage,
wherein the first variable voltage part comprising:
a first light blocking pattern which blocks the first light;
a first input electrode disposed on the first light blocking pattern and electrically connected to the first bias voltage line;
a second input electrode electrically connected to the second bias voltage line;
a first common output electrode disposed apart from the first input electrode and the second input electrode between the first input electrode and the second input electrode, wherein the first common output electrode is electrically connected to the first sensing gate electrode; and
a first common active pattern disposed under the first input electrode, the second input electrode and the first common output electrode.

* * * * *